United States Patent Office 3,284,388
Patented Nov. 8, 1966

3,284,388
IMIDAZOLINE-AMINE SOAP-RUBBER MIXTURES AS ASPHALT ADDITIVES
Robert F. Stierli, Lexington, Mass., assignor to W. R. Grace & Co., Cambridge, Mass.
No Drawing. Filed May 31, 1963, Ser. No. 284,310
8 Claims. (Cl. 260—23.7)

This invention relates to a process for incorporating rubber into bituminous materials and to the products produced thereby.

Btuminous materials such as asphalt have long been used in the construction of roads. Conventionally, asphalt is heated until it is sufficiently fluid to mix readily with aggregate to form a workable hot asphalt-aggregate mixture. The mixture is then spread and consolidated on the road.

It was known as early as 1930 that if the asphalt were modified with a small amount of rubber, its properties would be advantageously altered. The most important properties changed were (1) increased low temperature ductility; (2) improved toughness and tensile strength; (3) improved resistance to bleeding of roads during the hot summer months; and (4) improved cohesion of aggregate. Along with these, a number of minor improvements were also noted. Each type of rubber had its own effect on a given asphalt and the response of various asphalts to a given rubber was different.

The use of rubber-modified asphalt has been limited, however, because of certain inherent disadvantages in the methods of incorporating rubber in asphalt. Ordinarily, before the rubber may be added to the asphalt, it is necessary that the rubber be in a finely divided state such as in dry powdered form or in latex form. To prepare free-flowing dry powdered rubber, each particle of rubber must be coated with smaller particles of filler which is non-tacky. Commercially available powdered rubbers contain at least 20 percent by weight of filler. Such rubber is objectionable because the filler forms large amounts of sludge and makes dispersing difficult. The disadvantage of using rubber latex is that the latex and hot asphalt must be mixed until all the water is driven off. In addition, the mixture of latex and hot asphalt tends to bump and foam. This prevents proper mixing and creates a handling problem.

The rubber must be well dispersed in the asphalt to produce a rubber-modified asphalt with improved properties. The word "dispersion" is used herein to include both colloidal dispersion and solution of the rubber in the asphalt. Generally, to form a satisfactory dispersion of rubber in asphalt, temperatures of about 325–350° F. are necessary for periods of time ranging from 2 to 3 hours. Such high temperatures and extensive periods of heating are uneconomical and frequently detrimental to the asphalt.

It is a principal object of the present invention to overcome the aforementioned disadvantages and to provide a process for dispersing rubber in fluid asphalt quickly and economically. It is another object of the present invention to provide a rubber modified asphalt which adheres well to materials such as aggregate, metal, concrete and aged asphalt-aggregate mixtures.

Briefly stated, the process of the instant invention comprises mixing an asphalt anti-stripping additive with rubber and dispersing the additive-rubber mixture in fluid asphalt.

Asphalt anti-stripping additives are frequently used in the construction of roads for a number of reasons. It is almost impossible to obtain a good bond between asphalt and wet aggregate. Since aggregate is usually wet due to rain, snow, or humidity of the air, drying it prior to mixing with the asphalt is expensive and impractical. Furthermore, when the asphalt aggregate composition is subsequently exposed to water, the water frequently displaces the asphalt from the aggregate and may strip it completely. To avoid the drying procedure and to obtain a more permanent bond between the asphalt and aggregate, anti-stripping additives are incorporated into the asphalt.

Asphalt anti-stripping additives are water insoluble. They impart to the asphalt the properties of readily wetting and effectively coating the surfaces of a variety of dry or wet aggregates. The additives also impart to the asphalt resistance to the stripping action of water on the asphalt after the asphalt and aggregate are combined.

The asphalt anti-stripping additive may be acidic or basic in character depending on whether a basic or acidic type of aggregate is used. The additive may also be both acidic and basic so that a variety of aggregate mixtures may be used.

In the instant invention any asphalt anti-stripping additive which will disperse the rubber in asphalt may be used. These additives are generally available commercially in the form of viscous oils or waxes.

The asphalt anti-stripping additive disclosed in U.S. Patent No. 2,514,954 is preferred since it possesses both acidic and basic groups which assure chemical affinity, to the surface of a variety of aggregates. In addition, its lipophilic character makes it readily soluble in asphalt. The additive is formed by reacting a polyamine containing at least 3 amino groups with an acid mixture consisting essentially of higher fatty acids and rosin acids in proportion to leave unreacted at least one amino group of the amine, and then heating the resulting amine soap at an elevated temperature to cause decomposition of the soap group of the higher fatty acid with the amine, so as to form an amido group and leave the soap of the rosin acid in undecomposed condition. Reaction occurs in accordance with the following equations, RCOOH and R′COOH representing, respectively, the fatty acid and the rosin acid.

(1)

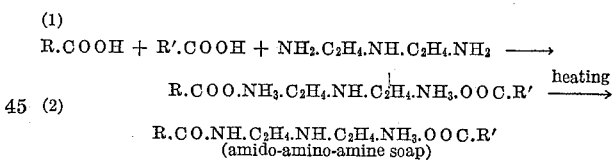

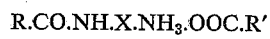
(amido-amino-amine soap)

A more general type formula for the amido-aminoamine soaps is the following:

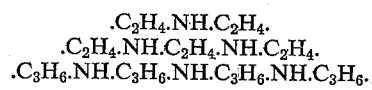

wherein R is the fatty acid radical, R′ is the rosin acid radical and X represents the residue of a polyamine containing originally 3 to 6 amine groups, the residue being the amine less 2 amine groups. Examples of residues represented by X are

.C₂H₄.NH.C₂H₄.
.C₂H₄.NH.C₂H₄.NH.C₂H₄.
.C₃H₆.NH.C₃H₆.NH.C₃H₆.NH.C₃H₆.

Examples of higher fatty acids, i.e., RCOOH of Equation 1, include oleic, linoleic, linolenic and lauric acid. Mixed fatty acids of vegetable and animal oils such as cottonseed, cocoanut, linseed and fish oil are also suitable.

Examples of the rosin acids, i.e. R′COOH of Equation 1, include abietic acid and tall oil. Crude tall oil is particularly satisfactory since it is comprised of about 50 percent fatty acids and 50 percent rosin acids which contain substantial proportions of abietic acid.

The polyamine should contain at least 3 amine groups per molecule. Representative of such polyamines are diethylene triamine, triethylene tetramine, tetraethylene pentamine, dipropylene triamine, tributylene tetramine and pentaethylene hexamine.

In the instant invention, a preferred form of asphalt anti-stripping additive is obtained by reacting only the fatty acid and polyamine at elevated temperature under reduced pressure to obtain a product which contains a predominant amount of an imidazoline, and a residue of the amido-amino-amine soap of the fatty acid. Reaction occurs in accordance with the following equation wherein RCOOH represents the fatty acid.

(3)

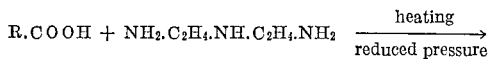

(4)

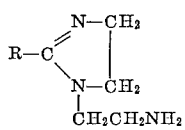

The imidazoline (4) is more strongly basic than the amido-amino-amine soap of Equation 2 and assures good adhesion to aggregate having an acidic character.

A more general type formula for the imidazoline would be the following:

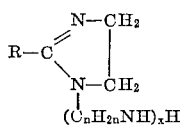

wherein R is the fatty acid radical, $x$ is an integer from 1 to 5, inclusive, and $n$ is an integer from 2 to 4, inclusive.

If desired, the imidazoline-containing product may be reacted with rosin acid to obtain a product containing a predominant amount of substituted imidazoline. Reaction occurs in accordance with the following equation, wherein R'COOH represents the rosin acid.

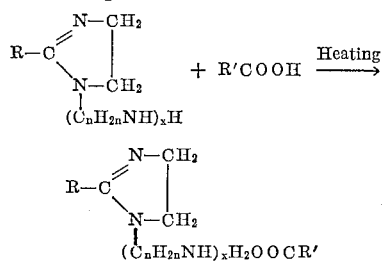

The asphalt anti-stripping additive may be diluted with any material which is substantially a non-solvent for the rubber. A true solvent for the rubber cannot be used as a diluent because it will convert the rubber to a gel and thus interfere with the dispersion of the rubber in the asphalt. Examples of suitable diluents for the additive are crude mixed vegetable fatty acids, tar oils, linseed oil and water.

To make this a workable process, it is necessary that the asphalt anti-stripping additive be incorporated into the rubber prior to the introduction of the rubber into the asphalt. The amount of additive added to the rubber is based on the rubber dosage and the length of time within which dispersion of the rubber in the asphalt is desired. In general, amounts of additive ranging from about 15 to 50 percent by weight of the rubber-additive mixture are satisfactory. Amounts of additive in excess of 50 percent by weight of the mixture may be used advantageously to extend the mixture.

Mixing of the rubber with the asphalt anti-stripping additive may be carried out in any conventional manner such as in a Banbury or Baker-Perkins mixer or by milling. For best results, the rubber and additive should be mixed until the rubber is thoroughly dispersed in the additive.

The rubber is preferably used in the form of rubber stock because of ease of handling. However, rubber latices and dried powdered rubber may also be used.

The rubber-asphalt anti-stripping additive mixture may be extended with a number of materials which are substantially non-solvents for the rubber. The extenders may be solid, semi-solid or liquid depending upon the particular form of rubber-additive mixture desired.

Rubber-asphalt anti-stripping additive mixtures in paste form may be obtained by using extenders such as excess additive, crude tall oil, water, furfural, paraffin wax, linseed oil and mixed vegetable fatty acids.

In a preferred specific embodiment of the instant invention, rubberized asphalt emulsions are formed by dispersing the rubber-additive mixture in hot fluid asphalt and then adding sufficient water and emulsifying agent to the dispersion to form a free-flowing rubberized asphalt emulsion. The asphalt emulsion is spread on in the usual way; and after the water has evaporated, the asphalt hardens into a continuous mass.

Rubber-asphalt anti-stripping additive mixtures in dry powdered form may be produced by using dry extenders, i.e. fillers, such as vermiculite, perlite, fly ash, ground quartz, clay, diatomaceous earth, soapstone, bentonite, ground limestone, carbon black and barytes. In the instant invention the filler may be used in amounts about 6 percent by weight less than the amount normally necessary to produce a dry powdered rubber. This results in less sludge formation and greater ease of handling.

The rubber-additive mixture may be dispersed in the asphalt at temperatures as low as 275° F. within a period of time ranging from 5 to 30 minutes depending upon the amount of additive and rubber used. The inclusion of an extender in the rubber-additive mixture may lengthen the time required to disperse the mixture in the asphalt depending upon the particular extender used. For example, dry extenders, i.e. fillers, may require as long as 30 minutes.

According to the present invention, the rubber may be natural or synthetic rubber. The synthetic rubbers include homopolymers and copolymers of conjugated diolefins, i.e. polybutadiene, polyisoprene, butadiene-styrene copolymers, butadiene-acrylonitrile copolymers, homopolymers and copolymers of methylpentadiene; and polymeric forms of chlorine substitution products of conjugated diolefins, i.e., polychloroprene.

The term "asphalt" as used herein referes to bituminous materials, generally employed in the construction and repair of roads. They are normally solid, semi-solid, or viscous liquids at ordinary ambient temperatures. Representative of such materials are petroleum and native asphalt; pyrogenous distillates such as oil-gas tar, coal tar; pyrogenous residues such as blown asphalts, sludge asphalts, pressure tars, tar pitch; and pyrobitumens. Dispersions or solutions of the bituminous materials in liquids such as naphtha, kerosene and stove oils to form liquid compositions conventionally referred to as "liquid asphalts" are also contemplated by the invention.

The penetration value of the asphalt used in the following examples was determined according to ASTM D-5-25.

Proportions used here and elsewhere herein refer to parts by weight.

This invention is further illustrated by the following examples:

*Example 1*

An asphalt anti-stripping additive was prepared by reacting about 3 parts by weight of oleic acid and 1 part by weight of a mixture of 25 percent by weight of diethylene triamine and 75 percent by weight of a mixture of pentaethylenehexamine and hexaethyleneheptamine ("Polyamine H") at 350° F. and at a reduced pressure of 0.7 to 0.5 p.s.i. for about 5 hours to form an additive containing a predominant amount of imidazoline.

Since water catalyzes side reactions and hydrolyzes imidazolines, it was removed as it was formed in order to achieve maximum conversion to the imidazoline.

The average composition of the additive, was determined by infrared absorption analysis and comprised about 80 percent by weight of the imidazoline and about 20 percent by weight of the amido-amino-amine soap of oleic acid. This asphalt anti-stripping additive was used in all of the following examples.

*Example II*

Neoprene rubber stock ("Neoprene WRT") was milled for 10 minutes to plasticize the neoprene. 75 grams of the milled neoprene and 20 grams of the asphalt anti-stripping additive were then mixed in a Banbury mixer until the mixture began to knit together. The mixture was transferred to a Baker-Perkins mixer and 30 grams of asphalt anti-stripping additive were then added to the mixture. Mixing was continued until a substantially smooth paste was obtained.

Asphalt, having a penetration value of 130–150, was heated to 275° F. When the asphalt became fluid, 5 grams of the neoprene-additive mixture gradually added thereto with mixing. The amount of the mixture added to the asphalt was equivalent to 3 percent by weight of the neoprene based on the weight of the asphalt. The neoprene-additive mixture dispersed readily in the asphalt. At the end of 2 minutes of heating at 275° F., a sample of the resulting asphalt-neoprene-additive dispersion was removed and cooled to room temperature. The cooled sample displayed good elasticity and strength. The heating was continued at 275° F. for an additional 8 minutes to assure thorough solution of the neoprene-additive mixture in the asphalt.

The procedure above was repeated except that the asphalt anti-stripping additive was not used. The asphalt was heated to 275° F., and when it became fluid, the milled neoprene was gradually added to it with mixing.

The neoprene, however, would not dissolve in the asphalt at 275° F. The temperature of the asphalt was then raised to 325° F. and the milled neoprene was gradually added to the asphalt with mixing. About 3 grams of the milled neoprene were dissolved in the asphalt in approximately 2½ hours.

*Example III*

Aggregate (Rhyolite stone graded so that 100 percent passes ⅜" sieve and is retained on a #4 sieve) was washed in distilled water and allowed to air-dry. It was then oven-dried at 270°–300° F. The dried aggregate was then thoroughly wetted with distilled water having a pH of 6.0 to 7.0.

The wet aggregate and the hot asphalt-neoprene-additive dispersion prepared in Example II were mixed in approximately equivalent amounts. The dispersion thoroughly coated the aggregate. In addition, a strong bond developed between the aggregate and the asphalt when the aggregate-asphalt dispersion mixture cooled to room temperature.

At room temperature, the aggregate-asphalt dispersion mixture was submerged in water in an aluminum pan and pressed against the surface of the aluminum. After 7 days, about 95 percent of the aggregate was still thoroughly coated with asphalt. The strong bond between the aggregate and asphalt also was maintained. In addition, a strong bond developed between the surface of the aluminum pan and the aggregate-asphalt dispersion mixture.

The procedure above was repeated execpt that the wet aggregate was mixed with the hot asphalt-neoprene composition formed in Example II without the asphalt anti-stripping additive. The asphalt-neoprene composition coated only about 45 percent of the wet aggregate. When the aggregate-asphalt-neoprene composition cooled to room temperature, the bond which developed between the aggregate and the asphalt was much weaker than that in the aggregate-asphalt dispersion mixture above. At room temperature, the aggregate-asphalt-neoprene composition was submerged in water in an aluminum pan and pressed against the surface of the aluminum. After 1 hour, only about 5 percent of the aggregate was still thoroughly coated. The bond between the aggregate and asphalt was poor compared to that maintained in the aggregate-asphalt dispersion mixture above. In addition, no bond developed between the surface of the aluminum pan and the aggregate-asphalt-neoprene composition.

*Example IV*

A 76½–23½ butadiene-styrene copolymer ("GRS x 274")

was milled for about 10 minutes to produce a plastic mass. 3 parts of the milled copolymer and 1 part of the asphalt anti-stripping additive were then mixed in a Banbury mixer until the mixture began to knit together. The mixture was transferred to a Baker-Perkins mixer and 2 parts of the asphalt anti-stripping additive were then added to the mixture. Mixing was continued until a substantially smooth paste was formed.

Asphalt, having a penetration value of 130–150, was heated to 275° F. When the asphalt became fluid, 6 parts of the copolymer-additive mixture were gradually added thereto with mixing. The amount of the mixture added to the asphalt was equivalent to 3 percent by weight of the copolymer based on the weight of the asphalt. The copolymer-additive mixture dispersed readily in the asphalt. The copolymer appeared to be substantially dissolved in the asphalt at the end of 10 minutes of heating at 275° F.

The hot asphalt-copolymer-additive dispersion was mixed with wet coarse sand. The asphalt dispersion thoroughly coated the sand, and at room temperature, formed an intimate mixture therewith.

The mixture was submerged in water in an aluminum pan and pressed against the surface of the aluminum. After 24 hours, about 95 percent of the sand was still thoroughly coated with the asphalt. In addition, a strong bond developed between the surface of the aluminum pan and the mixture.

*Example V*

The procedure of Example IV was repeated except that a 60–40 butadiene-styrene copolymer ("FRX 1014") was used. The results were substantially the same as in Example IV.

*Example VI*

In this example the rubber-additive mixture was prepared in dry powdered form before being dispersed in the asphalt.

45 parts of a 76½–23½ butadiene-styrene copolymer ("FR-S 1004") were blended with 15 parts of the asphalt anti-stripping additive in a Banbury mill for about 5 minutes to produce a substantially smooth mixture. The mixture was then placed on a mill and blended with 10 parts of vermiculite for about 10 minutes. The resulting dry mixture was granulated by passing it through an Al-steele granulator using a ¼" screen. The granulated copolymer-additive mixture contained about 14 percent filler.

Asphalt having a penetration value of 130–150 was heated to 275° F. When the asphalt became fluid, 4.7 grams of the granulated mixture were gradually added to it with mixing. The amount of granulated mixture added was equivalent to 3 percent by weight of copolymer based on the weight of asphalt. Solution of the granulated copolymer in the asphalt at 275° F. required approximately 30 minutes.

*Example VII*

15 parts of asphalt anti-stripping additive, 45 parts of 76½–23½ butadiene-styrene copolymer ("FRS–1004")

and 26 parts of water were blended in a Baker-Perkins mixer to form a substantially smooth paste.

100 parts of asphalt having a penetration value of 130–150 were heated to 275° F. When the asphalt became fluid, 5.7 parts of the copolymer-additive-water paste were gradually added to it with mixing. The paste dispersed readily in the fluid asphalt. The resulting asphalt dispersion was heated for about two minutes at 275° F. and then allowed to cool to room temperature. At room temperature the asphalt dispersion was tough and somewhat rubbery.

*Example VIII*

The procedure of Example VII was repeated except that linseed oil was used instead of water.

The copolymer-additive-linseed oil paste dispersed readily in the hot fluid asphalt. At room temperature the resulting asphalt dispersion was tough and rubbery.

*Example IX*

A rubberized asphalt emulsion was formed in this example. 1.5 parts of asphalt anti-stripping additive and 4.5 parts of 76½–23½ butadiene-styrene copolymer ("FRS 1004") were blended on a mill to form a plastic mixture. This mixture was transferred to a Baker-Perkins mixer. 3 parts of crude vegetable fatty acid were then added to the mixture and mixing was continued until a substantially smooth paste was formed. 150 parts of asphalt having a penetration value of 130–150 were heated to 275° F. When the asphalt became fluid, 9 parts of the copolymer-additive-fatty acid mixture were gradually added to it with mixing. The mixture dispersed readily in the fluid asphalt. The resulting asphalt dispersion was heated for about two minutes at 275° F.

As the asphalt disperson cooled to room temperature, sufficient water and 0.15 part of sodium hydroxide were mixed into it to form a free-flowing emulsion.

In the following table a number of examples are listed wherein the general procedure used was similar to that disclosed in Examples II through IX. The asphalt anti-stripping additive was also the same as that described in Example I.

and a remaining amount of an amido-amino-amine soap having the general formula $$R \cdot CO \cdot NHX \cdot NH_3 \cdot OOC \cdot R$$

wherein R is a radical of a higher fatty acid and $x$ represents the radical of a polyamine containing originally 3 to 7 amine groups per molecule, said radical being the amine less the terminal amine groups when said reaction product is present at a level of 15 to 50 percent by weight of the composition and said rubber is a polymer which has been formed through carbon to carbon double bond interaction.

2. The composition as defined in claim 1 wherein said composition contains an extender.

3. The composition as defined in claim 2 wherein said extender is water.

4. The composition as defined in claim 2 wherein said extender is vermiculite.

5. The composition as defined in claim 2 wherein the extender is tall oil.

6. A process for preparing rubberized asphalt which comprises mixing an asphalt anti-stripping additive with rubber and dispersing the mixture in fluid asphalt; wherein the asphalt anti-stripping additive is a reaction product of a higher fatty acid and a polyamine; said reaction product containing a predominant amount of an imidazoline having the general formula

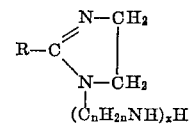

wherein R is the radical of the higher fatty acid, $n$ is an integer from 2 to 4, inclusive, and $x$ is an integer from 1 to 5, inclusive; and a remaining amount of an amido-amino-amine soap having the general formula $$R \cdot CO \cdot NH \cdot X \cdot NH_3 \cdot OOC \cdot R$$

wherein R is a radical of a higher fatty acid and X represents the radical of a polyamine containing originally 3 to 7 amine groups per molecule, said redical being the

| Example No. | Rubber | Asphalt Anti-Stripping Additive (percent by wt. rubber-additive mixture) | Extender (percent by weight rubber-additive-extender mixture) | Dispersion of Rubber Additive Mixture in Asphalt | | Percent by wt. Rubber Based on Asphalt |
|---|---|---|---|---|---|---|
| | | | | Temperature (° F.) | Time (min.) | |
| X | Butyl rubber ("Enjay Butyl") | 50 | | 275 | Within 10 minutes | 3 |
| XI | Polyisobutylene ("Vistanex", molecular weight 200,000). | 50 | | 275 | Within 10 minutes | 3 |
| XII | Natural rubber | 50 | | 275 | Within 10 minutes | 3 |
| XIII | Butadiene-styrene-acrylonitrile terpolymer (Mooney viscosity of 92 at 212° F.). | 50 | | 275 | Within 10 minutes | 3 |
| XIV | 76½–23½ butadiene-styrene copolymer ("FRS 1004"). | 34 | Tall oil (33%) | 275 | Within 10 minutes | 3 |
| XV | 76½–23½ butadiene-styrene copolymer ("FRS 1004"). | 34 | Crude Mixed Vegetable Fatty Acids (33%). | 275 | Within 10 minutes | 3 |
| XVI | 76½–23½ butadiene-styrene copolymer ("FRS 1004"). | 34 | Tar Base Oil (33%) | 275 | Within 10 minutes | 3 |
| XVII | 76½–23½ butadiene-styrene copolymer ("FRS 1004"). | 34 | Crude Mixed Vegetable Fatty Acids (33%). | 275 | Within 10 minutes | 1 |
| XVIII | 76½–23½ butadiene-styrene copolymer ("FRS 1004"). | 34 | Tar Base Oil (33%) | 275 | Within 10 minutes | 1 |

I claim:

1. A composition for rubberizing asphalt comprised of rubber and the reaction product of a higher fatty acid and a polyamine, said reaction product containing a predominant amount of an imidazoline having the general formula

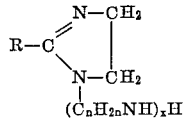

wherein R is the radical of the higher fatty acid, $x$ is an integer from 1 to 5 and $n$ is an integer from 2 to 4;

amine less the terminal amine groups, said rubber is a polymer which has been formed through carbon to carbon double bond interaction.

7. The process of claim 6 wherein the acid is oleic acid and the polyamine is a mixture comprised of 25 percent by weight of diethylene triamine and 75 percent by weight of a mixture of pentaethylenehexamine and hexaethyleneheptamine.

8. The process of claim 7 wherein the reaction product is comprised of imidazoline in an amount about 80 percent by weight and the amido-amino-amine soap of oleic acid in an amount about 20 percent by weight.

(References on following page)

References Cited by the Examiner

UNITED STATES PATENTS

| | | | |
|---|---|---|---|
| 2,431,800 | 12/1947 | Geiges | 260—23 |
| 2,514,954 | 7/1950 | Johnson et al. | 260—97.5 |
| 2,807,596 | 9/1957 | Flickinger | 260—28.5 |
| 2,857,351 | 10/1958 | Carroll | 260—28.5 |
| 2,863,841 | 12/1958 | Bernier et al. | 260—28.5 |
| 2,978,427 | 4/1961 | Pullar et al. | 260—28.5 |
| 3,055,853 | 9/1962 | Pickell | 260—23.7 |
| 3,097,179 | 7/1963 | Ceintrey | 260—28.5 |
| 3,129,106 | 4/1964 | Katz | 260—404.5 |
| 3,202,623 | 8/1965 | Endres et al. | 260—28.5 |
| 3,230,104 | 1/1966 | Falkenburg et al. | 106—277 |

LEON J. BERCOVITZ, *Primary Examiner.*

DONALD E. CZAJA, *Examiner.*

R. A. WHITE, *Assistant Examiner.*